(12) United States Patent
Gray, Jr.

(10) Patent No.: US 6,578,533 B1
(45) Date of Patent: Jun. 17, 2003

(54) CONTROLLED HOMOGENEOUS-CHARGE, COMPRESSION-IGNITION ENGINE

(75) Inventor: Charles L. Gray, Jr., Pinckney, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 09/995,748

(22) Filed: Nov. 29, 2001

(51) Int. Cl.[7] ............................................... F02B 75/04
(52) U.S. Cl. ................................... 123/78 D; 123/48 D
(58) Field of Search ............................ 123/78 D, 78 AA, 123/48 AA, 48 D

(56) References Cited

U.S. PATENT DOCUMENTS

| | | | | |
|---|---|---|---|---|
| 4,246,873 A | * | 1/1981 | Lih-Liaw | 123/48 AA |
| 4,987,863 A | * | 1/1991 | Daly | 123/48 AA |
| 5,188,066 A | * | 2/1993 | Gustavsson | 123/48 A |
| 6,260,520 B1 | * | 7/2001 | Van Reatherford | 123/48 AA |

* cited by examiner

*Primary Examiner*—Tony M. Argenbright
*Assistant Examiner*—Katrina B. Harris
(74) *Attorney, Agent, or Firm*—Lorusso, Loud & Kelly

(57) ABSTRACT

An engine has a plurality of combustion cylinders with a first piston reciprocably mounted in each of the combustion cylinders in the conventional manner. The engine head has, in communication with each of the combustion cylinders, a cylindrical recess containing a reciprocably mounted second piston. On the side of the second piston opposite the combustion chamber is a control chamber with inlets and outlets for controlling movement of the second piston. The second piston is used to increase the compression ratio without appreciably reducing the expansion ratio. Alternatively, the second piston may be used as a pump to pump fluid from the control chamber. In yet another alternative method of operation, the second piston can be driven outward within the cylindrical recess to an extent which varies in accordance with power demand, thereby varying the compression ratio in accordance with the power demand.

30 Claims, 1 Drawing Sheet

CONTROLLED HOMOGENEOUS-CHARGE, COMPRESSION-IGNITION ENGINE

BACKGROUND OF THE INVENTION

1. Field of the Invention

The invention relates to method and apparatus for controlling initiation of homogeneous-charge, compression-ignition (HCCI) over a wide range of load in diesel-cycle engines to reduce $NO_x$ nd PM emissions. The field of application is internal combustion engines for motor vehicles.

2. The Prior Art

The growing use of diesel-cycle engines in motor vehicles greatly adds to the atmospheric presence of pollutants such as oxides of nitrogen and particulate matter. Conventional diesel-cycle engines emit nitrogen oxide ($NO_x$) and particulate matter (PM) substantially in excess of levels achievable in Otto-cycle (e.g., gasoline homogeneous-charge) engines, yet diesel-cycle engines achieve substantially better fuel economy. Because of the higher fuel economy, diesel-cycle engines dominate the heavy-duty truck market and much of the off-road commercial vehicle market, with growing penetration in light duty trucks. Thus, technology which could substantially reduce $NO_x$ and PM emissions in a cost effective and efficient manner from diesel-cycle engines is highly desired.

A substantial body of prior art describes the operation of homogenous-charge, compression-ignition (HCCI) engines. A homogenous-charge of fuel and air (oxygen) will auto-ignite during compression at a particular compression level (e.g., compression ratio), depending primarily on (1) the nature of the fuel (e.g., octane level), (2) concentration of the reactants (i.e., fuel and oxygen), and (3) the initial temperature of the charge mixture of fuel and air (including any recirculated exhaust gas). The compression of the charge both increases temperature and concentration of reactants, as well as increases pressure. There is one compression ratio for a given set of starting conditions where auto-ignition (i.e., compression ignition) will occur. If that compression ratio is the same as the mechanical compression ratio of the engine, then combustion will occur at the "right" time, i.e., with combustion initiation at piston top dead center (TDC) and peak cylinder pressure occurring generally within 10 degrees of crank angle (depending on engine speed), and emissions are low and efficiency is high. However, if the auto-ignition compression ratio is lower than the compression ratio of the engine, then combustion will occur before piston top dead center (TDC) and the engine will knock unacceptably. If the auto-ignition compression ratio is higher than the compression ratio of the engine, then misfire will occur and the engine will not operate. Therefore, the primary problem with the prior art (and the commercialization limitation of this combustion process) is the absence of an acceptable means of controlling the initiation of HCCI over the range of operating conditions (e.g., ambient temperature and load) necessary for a practical engine.

SUMMARY OF THE INVENTION

The present invention achieves control of the initiation of HCCI by mechanically controlling the engine compression ratio during engine operation so that for a particular set of operating conditions the initiation of HCCI will occur at an optimum condition when the piston has reached near TDC, generally within five crank angle degrees before to ten crank angle degrees after TDC depending on engine speed. One method of controlling engine compression ratio is to change the stroke of the piston by means such as; (1) raising or lowering the centerline of the crankshaft, (2) changing the effective length of the piston-to-crankshaft connecting rod, or (3) changing the effective length of the piston (and thus its displaced volume) above the piston/rod attachment. Another method of controlling engine compression ratio is to vary the height of the engine head above the TDC position of the piston.

Unfortunately, changing the compression ratio by any of these means also changes the expansion ratio of the engine and thus its thermal efficiency. For example, lowering the compression ratio of an engine to, for example 6, to avoid HCCI before piston TDC and to thereby avoid knock, would do so at the expense of engine efficiency. Also, such means of changing the compression ratio retains maximum compression at piston TDC. Given the very rapid combustion associated with HCCI, the peak combustion pressure generally occurs within ten crank angle degrees of TDC and for high engine loads produces undesirably high peak cylinder pressure and associated increased noise.

Accordingly, the present invention provides a diesel-cycle engine (capable of operating on a variety of fuels including gasoline and diesel) including a plurality of combustion cylinders and a first piston reciprocably mounted within each of the combustion cylinders. The piston presents a first face defining one boundary of a combustion chamber within a combustion cylinder and a head covers the combustion cylinders with a plurality of cylindrical recesses, each cylindrical recess opening into a respective one of the combustion cylinders. A second piston is reciprocably mounted in each of the cylindrical recesses in the head and presents a second piston face defining a second boundary of the combustion chamber. A fuel-air mixture is formed in a conventional manner to strive for a homogeneous mixture, with fuel injected into the air charge earlier than in a conventional diesel engine. A fuel-air mixture can be introduced into each cylinder, in succession, through a selected one of plural intake ports formed in the head, as practiced in conventional gasoline engines, or the fuel may be added to the air charge during air intake or compression.

A controller is provided for moving the second piston from a retracted position outward in the cylindrical recess in the head, to an extended position, during the end of each compression stroke (generally within five crank angle degrees before piston TDC) or the beginning of the expansion stroke (generally within ten crank angle degrees after piston TDC) of said piston, to reduce the volume of the combustion chamber and increase the compression ratio to a level causing auto-ignition of the fuel-air mixture.

In a preferred embodiment, the engine is further provided with a sensor for determining power demanded of the engine and with a controller for controlling the extended position of the second piston and thereby varying the compression ratio in accordance with the sensed power demand.

In accordance with another preferred feature of the present invention, the first piston has a face defining one boundary of the combustion chamber and a cylindrical recess formed therein axially aligned with a cylindrical recess in the engine head and, preferably, of the same diameter as the cylindrical recess in the engine head.

In accordance with another preferred aspect of the present invention, the second piston is a free-floating double face piston having one face defining the second boundary of the combustion chamber and a third face defining a control chamber in cooperation with a cylindrical recess in the engine head. An inlet port and an outlet port are provided for introducing hydraulic fluid to and exhausting hydraulic fluid from the control chamber. Each of these ports connects to a line having an on/off control valve therein whereby the second piston can be moved to its extended position by introduction of high pressure fluid into the control chamber and in another embodiment can be returned to its retracted position by the force of the expanding combustion gases in a power stroke.

In another aspect, the present invention provides a method for operation of the above-described engine, the method including moving the second piston outward from its retracted position to an extended position within a cylindrical recess within the head, to initiate each combustion stroke of the first piston, after the first piston has reached a point near top dead center, to reduce the volume of the combustion chamber and to increase the compression ratio to a level causing auto-ignition of a fuel-air mixture within the combustion chamber. The method of the present invention preferably includes the sensing of power demanded of the engine, e.g., by depression of an accelerator pedal, and controlling the extended position of the second piston, and thereby controlling the compression ratio, in accordance with the sensed power demand.

The preferred embodiment of the present invention maintains a high expansion ratio to maintain high efficiency by providing a method of operation and a means for final charge compression when the piston has already reached near TDC. This avoids engine knocking while providing sufficient compression to auto-ignite low fuel concentrations (light load) under even low charge temperatures.

For example, a fuel that would auto-ignite at a compression ratio of 6 under conditions of high load (maximum fuel concentration) and maximum expected initial charge temperature, would not auto-ignite at lower loads or temperatures and would thus need a means to increase compression ratio under those conditions. In this example, a preferred embodiment of the present invention would provide a conventional piston and crankshaft mechanism with a compression ratio of 6 in the conventional manner, but would also provide a movable surface for the combustion chamber, for example a second piston mounted in the head, which would be able to rapidly further reduce the volume of the combustion chamber (and thus increase compression ratio) after the piston has reached near TDC. The present invention thus provides a method of operation and a means for controlling HCCI at or near piston TDC while maintaining high compression and expansion ratios necessary to maintain high engine efficiency over a range of operating conditions.

BRIEF DESCRIPTION OF THE DRAWING

The solo drawing FIGURE is a schematic view of a preferred embodiment of one combustion chamber of an engine in accordance with the present invention.

DESCRIPTION OF THE PREFERRED EMBODIMENTS

Figure 1:
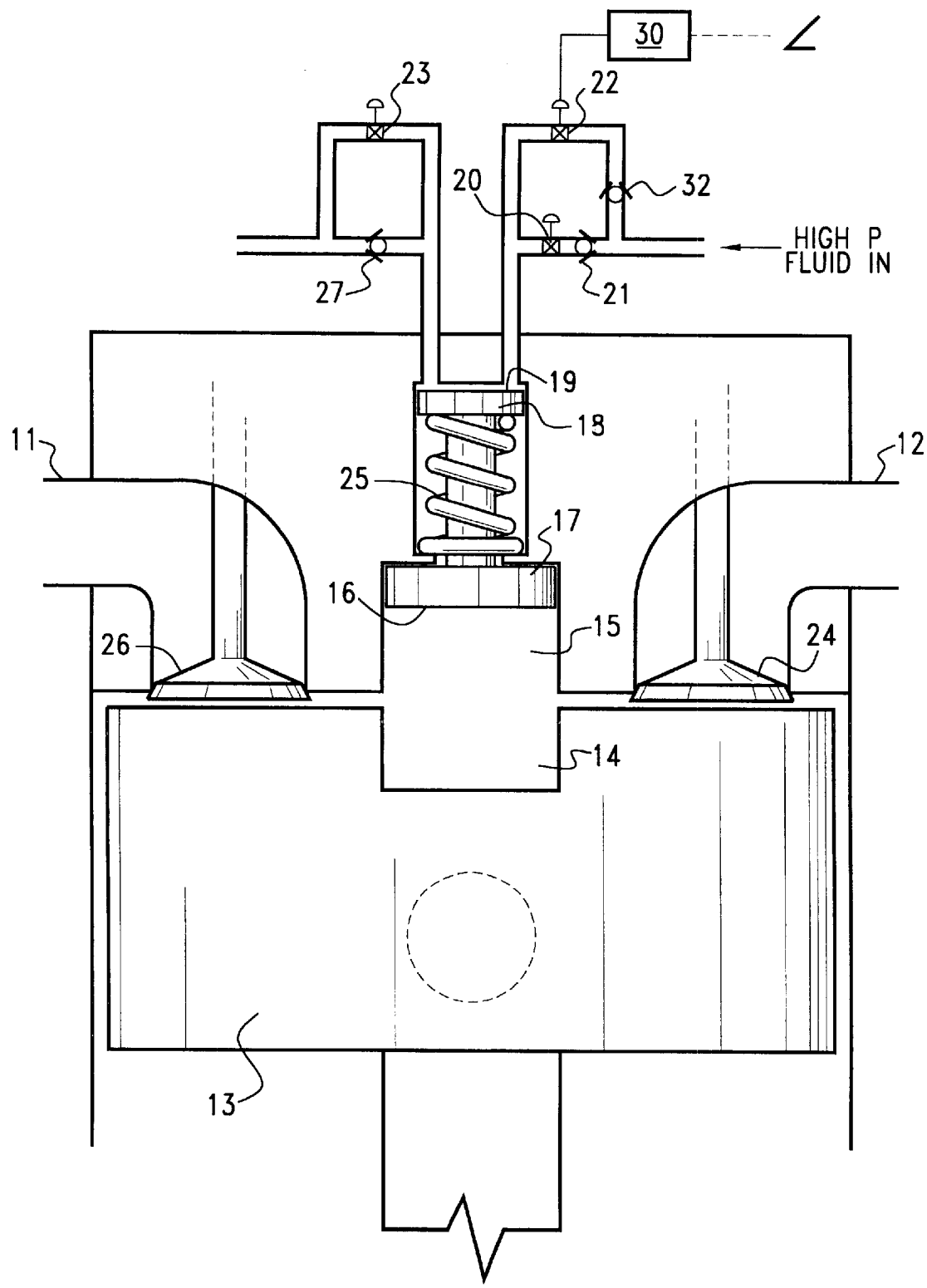

Referring to FIG. 1, intake air and fuel (homogeneous charge) enter through engine intake port 11 and exhaust gases exit the engine through exhaust port 12 in a conventional manner, whether operating in a 4 stroke or a 2 stroke cycle. Piston 13 is driven with reciprocating motion to drive a crankshaft (not shown) in a conventional manner. However, the top or "first face" of the piston is provided with a central recess 14 hereinafter referred to as a "piston bowl." The volume of piston bowl 14 is sized to provide a high compression and expansion ratio (e.g., 19) of a conventional Diesel-cycle engine, assuming a conventional flat engine head. However as shown, a second recess (a cylindrical chamber) 15 with a movable surface 16, is formed in the combustion chamber side of piston 17, i.e., in the head. The effective volume of recess 15 can be reduced to zero or expanded to a volume sufficient to prevent auto-ignition of a particular homogeneous fuel-air mixture at stoichiometric conditions and the maximum expected initial, pre-compression temperature (e.g., to a volume which provides a piston TDC compression ratio of 7).

The movable surface 16 ("second face") is provided on a piston 17 which is attached to another piston 18. High pressure fluid ("fluid" as used herein refers to hydraulic fluid) is introduced into enclosed chamber 19 above piston 18 through on/off valve 20 at an optimum time as piston 13 nears TDC, generally between five crank angle degrees before and TDC, of the compression stroke. Pistons 17 and 18 are in their upmost position ("retracted position") as shown. The force of the high pressure fluid on piston 18 (on the "third face") accelerates connected pistons 17 and 18 toward an "extended position" to quickly reduce the volume of the head chamber 15 from its maximum volume to zero volume providing a final compression of the homogeneous fuel-air charge previously contained in chambers 14 and 15. The final compressed volume provides a compression ratio sufficient to auto-ignite the fuel being used, over the range of the desired fuel-air ratios and the expected range of initial homogeneous fuel-air mixture temperatures. Optional check valve 21 may be used to check the reverse flow of fluid once combustion occurs and the pressure on piston 17 rises significantly. Piston 13 is then forced down by expansion of the combustion gases to produce engine torque. Connected pistons 17 and 18 may be allowed to be accelerated upward from the force of high pressure combustion gas acting on surface 16, either by omitting check valve 21 while leaving valve 20 open or by adding a second line connected to the high pressure fluid source with on/off valve 22 timed to open for optimum efficiency. If connected pistons 17 and 18 are allowed to accelerate upward, high pressure fluid flow produces hydraulic power in the manner of U.S. Pat. No. 5,611,300, the teachings of which are incorporated herein by reference. Check valve 32 can be added to prevent back-flow of high pressure fluid.

If connected pistons 17 and 18 are not allowed to accelerate upward to produce hydraulic power, connected pistons 17 and 18 must still be repositioned in their upmost position ("retracted position") before the next compression stroke. This repositioning may be accomplished by on/off valve 23, which is installed in a line connecting chamber 19 ("control chamber") to a container of low pressure fluid (not shown), being opened before the piston 13 reaches its bottom dead center (BDC) position and before the engine exhaust valve 24 is opened, generally between 150 and 160 crank angle degrees after piston TDC in the expansion stroke. The remaining pressure in the combustion chamber below surface 16 will force connected pistons 17 and 18 up and discharge the fluid in chamber 19 to the low pressure fluid container (not shown). Alternatively, spring 25 may be used to force combined pistons 17 and 18 up as valve 23 is opened. If spring 25 is used, valve 23 is opened as the exhaust valve opens, generally around 170 crank angle degrees after TDC in the expansion stroke, and combined pistons 17 and 18 are returned to their upmost position by the end of the exhaust stroke. Expanded combustion gases are discharged through port 12 and a fresh charge of fuel and air is introduced through port 11 and through intake valve 26 in a conventional manner. Piston 13 then rises on its compression stroke and the process repeats. An optional check valve 27 may be installed in a parallel line between the low pressure fluid storage and chamber 19. This check valve 27 would increase system efficiency for fuel-air mixtures that did not auto-ignite as quickly and allow on/off valve 20 to be turned off before connected pistons 17 and 18 reach their bottom most position ("extended position") because the kinetic energy of connected pistons 17 and 18 would carry them to their bottom most position allowing low pressure fluid to flow through check valve 27 to charge chamber 19. The reduced flow of high pressure fluid through on/off valve 20 is saved hydraulic power.

Alternative embodiments of the invention include: (1) utilizing a mechanical means (instead of the hydraulic means of the preferred embodiment) such as a crankshaft driven cam, to quickly move connected pistons 17 and 18 of FIG. 1 to their down most position ("extended position") and (2) repositioning the movable surface 16 to another location on the engine head combustion side.

Another embodiment of the method of operation of the present invention will now be described with reference to FIG. 1. This embodiment operates like the method of the previously described embodiment except that on/off valve 20 can be left open for shorter periods than necessary for chamber 15 to reach zero volume. By shutting off valve 20 before connected pistons 17 and 18 reach their bottom most position, the final compression ratio of the engine is reduced from its maximum compression ratio achieved when combined pistons 17 and 18 reach their bottom most position. Thus, in this embodiment the "extended position" is a variable position short of the "bottom most position." This method of operation provides for a controlled, variable compression ratio engine. The engine can be controlled to provide an optimum compression ratio which depends on the structural design of the engine and the power demand, L the latter determined, for example, by the position of the accelerator pedal. Valve 20 is controlled (i.e., left open) for the time necessary to achieve the determined compression ratio, that time determined from experimental measurements during engine development/calibration. If an increased power output is commanded, e.g., at accelerator pedal 32, valve 20 would be turned off by controller 30 at a time so that, for example, combined pistons 17 and 18 reach only half the distance to their bottom most position and chamber 15 is reduced to one half of its maximum volume. The final compression ratio would, for example, be 12. This compression ratio is still high enough to auto-ignite a homogeneous charge of fuel and air. To achieve the increased power output, the intake charge would be compressed (either through turbo or super-charging) so that a larger mass of air (and oxygen) is introduced into the engine (for example, 50% more oxygen). With more oxygen, more fuel can be added and proportionately more power can be produced. Since the compression ratio is reduced from the normal maximum value, the peak cylinder pressure (which is the design structural limit for the engine) will not exceed the maximum cylinder pressure obtained when operating the engine in the normal, high compression ratio setting for optimum efficiency.

Thus, the present invention provides a method of operation and a means for controlling HCCI at or near engine piston TDC while maintaining high compression and expansion ratios necessary to maintain high efficiency, and avoiding engine knock over a wide range of engine operating conditions. Controlled HCCI provides high efficiency and low emissions in a diesel-cycle engine. This invention also provides a method of operation and a means for controlling HCCI at or near engine piston TDC while also providing a means for achieving variable compression ratios.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A diesel-cycle engine comprising:

a plurality of combustion cylinders;

a first piston reciprocally mounted within each of said combustion cylinders, said piston presenting a first piston face defining one boundary of a combustion chamber within said combustion cylinder;

a head covering said combustion cylinders and having a plurality of cylindrical recesses, each opening into a respective combustion cylinder;

a second piston reciprocally mounted in each of said recesses, said second piston presenting a second piston face defining a second boundary of the combustion chamber;

means for introducing a fuel-air mixture into the combustion chamber; and means for moving said second piston from a retracted position outward in said cylindrical recess, to an extended position, after said first piston has reached top dead center, during the beginning of the expansion stroke of said first piston, to reduce the volume of the combustion chamber and increase the compression ratio to a level causing auto-ignition of the fuel-air mixture.

2. An engine according to claim 1 further comprising:

means for sensing a power demand; and means for controlling the extended position of said second piston and thereby controlling the compression ratio in accordance with the sensed power demand.

3. An engine according to claim 1 wherein said second piston is a double faced piston additionally presenting a third piston face defining a control chamber in cooperation with a cylindrical recess in said head.

4. An engine according to claim 3 additionally comprising:

repositioning means for returning said second piston to its retracted position between successive compression strokes of said first piston.

5. An engine according to claim 4 wherein said repositioning means comprises an exhaust duct in communication with said control chamber and a control valve in said exhaust duct.

6. An engine according to claim 5 further comprising an inlet duct in communication with said control chamber and a control valve in said inlet duct.

7. An engine according to claim 6 further comprising by-pass lines connecting with the exhaust line and inlet lines, respectively, on opposing sides of the control valve and a check valve in each of said by-pass lines.

8. An engine according to claim 1 further comprising inlet and exhaust ports in said head and poppet valves for opening and closing said inlet and exhaust ports, respectively.

9. An engine according to claim 1 wherein said first piston face has a cylindrical recess facing cylindrical recess in said head.

10. An engine according to claim 9 wherein said recesses in said first piston face and said head have the same diameter.

11. An engine according to claim 1 wherein said means for moving moves said second piston to the extended position within ten crank angle degrees after TDC of said first piston.

12. A method of operating a diesel-cycle engine including a plurality of combustion cylinders and a first piston reciprocally mounted within each of the combustion cylinders and presenting a first piston face defining one boundary of a combustion chamber within a combustion cylinder; a head covering the combustion cylinders and having exhaust ports and a plurality of cylindrical recesses, each of the cylindrical recesses opening into a respective combustion cylinder; a second piston reciprocally mounted in each of the recesses; and an engine exhaust valve for opening and closing each exhaust port, the second piston presenting a second piston face defining a second boundary of the combustion chamber, said method comprising:

introducing a fuel-air mixture into the combustion chamber;

compressing the fuel-air mixture by a compression stroke of the first piston; and moving said second piston outward from a retracted position to an extended position within a cylindrical recess within the head after the first piston has reached top dead center at the beginning of the expansion stroke of said first piston, to reduce the volume of the combustion chamber and to increase the compression ratio to a level causing auto-ignition of the fuel-air mixture.

13. A method according to claim 12 further comprising:

sensing power demanded of the engine; and controlling the extended position of the second piston and thereby controlling the compression ratio in accordance with the sensed power demand.

14. A method according to claim 12 wherein the second piston is a double faced piston additionally presenting a third piston face defining a control chamber in cooperation with the cylindrical recess in the head, and wherein said moving of the second piston includes introducing a fluid at high pressure into the control chamber to drive the second piston to its extended position.

15. A method according to claim 12 wherein said retracted position provides the combustion chamber with a volume sufficient to prevent auto-ignition of a particular homogeneous fuel-air mixture at stoichiometric conditions and the maximum expected initial, pre-compression temperature.

16. A method according to claim 12 wherein the second piston presents a third piston face defining a control chamber in cooperation with a cylindrical recess in the head and wherein the engine further includes a low pressure line connecting the control chamber to a low pressure fluid reservoir and an on/off valve located in the low pressure line, said method further comprising:

opening the on/off valve before the first piston reaches bottom dead center and before the engine exhaust valve is opened at the conclusion of a power stroke of the first piston, thereby discharging fluid from the control chamber to the low pressure reservoir and returning the second piston to its retracted position by the force of the expanding combustion gases.

17. A method according to claim 16 further comprising:

sensing power demanded of the engine; and controlling the timing of closing the on/off valve to in turn control the extended position of the second piston and the maximum compression ratio in accordance with the sensed power demand.

18. A method according to claim 12 wherein the second piston is moved to the extended position within ten crank angle degrees after TDC of the first piston.

19. A diesel-cycle engine comprising:

a plurality of combustion cylinders;

a first piston reciprocally mounted within each of said combustion cylinders, said piston presenting a first piston face defining one boundary of a combustion chamber within said combustion cylinder;

a head covering said combustion cylinders and having a plurality of cylindrical recesses, each opening into a respective combustion cylinder;

a second piston reciprocally mounted in each of said recesses, said second piston being a double-faced piston presenting a second piston face defining a second boundary of the combustion chamber and a third piston face defining a control chamber in cooperation with a cylindrical recess in said head;

repositioning means for returning said second piston to its retracted position between successive compression strokes of said first piston, said repositioning means comprising an exhaust duct in communication with said control chamber and a control valve in said exhaust duct;

means for introducing a fuel-air mixture into the combustion chamber; and means for moving said second piston from a retracted position outward in said cylindrical recess, to an extended position, after said first piston has reached top dead center, during the beginning of the expansion stroke of said first piston, to reduce the volume of the combustion chamber and increase the compression ratio to a level causing auto-ignition of the fuel-air mixture.

20. An engine according to claim 19 further comprising:

means for sensing a power demand; and means for controlling the extended position of said second piston and thereby controlling the compression ratio in accordance with the sensed power demand.

21. An engine according to claim 19 further comprising an inlet duct in communication with said control chamber and a control valve in said inlet duct.

22. An engine according to claim 21 further comprising by-pass lines connecting with the exhaust line and inlet lines, respectively, on opposing sides of the control valve and a check valve in each of said by-pass lines.

23. An engine according to claim 19 further comprising inlet and exhaust ports in said head and poppet valves for opening and closing said inlet and exhaust ports, respectively.

24. An engine according to claim 19 wherein said first piston face has a cylindrical recess facing cylindrical recess in said head.

25. An engine according to claim 24 wherein said recesses in said first piston face and said head have the same diameter.

26. A method of operating a diesel-cycle engine including a plurality of combustion cylinders and a first piston reciprocally mounted within each of the combustion cylinders and presenting a first piston face defining one boundary of a combustion chamber within a combustion cylinder; a head covering the combustion cylinders and having exhaust ports and a plurality of cylindrical recesses, each of the cylindrical recesses opening into a respective combustion cylinder; a double-faced second piston reciprocally mounted in each of the recesses; and an engine exhaust valve for opening and closing each exhaust port, the second piston presenting a second piston face defining a second boundary of the combustion chamber and a third piston face defining a control chamber in cooperation with the cylindrical recess in the head, said method comprising:

introducing a fuel-air mixture into the combustion chamber;

compressing the fuel-air mixture by a compression stroke of the first piston; and introducing a fluid at high pressure into the control chamber to drive said second piston outward from a retracted position to an extended position within a cylindrical recess within the head after the first piston has reached top dead center at the beginning of the expansion stroke of said first piston, to reduce the volume of the combustion chamber and to increase the compression ratio to a level causing auto-ignition of the fuel-air mixture.

27. A method according to claim 26 further comprising:

sensing power demanded of the engine; and controlling the extended position of the second piston and thereby controlling the compression ratio in accordance with the sensed power demand.

28. A method according to claim 26 wherein said retracted position provides the combustion chamber with a volume sufficient to prevent auto-ignition of a particular homogeneous fuel-air mixture at stoichiometric conditions and the maximum expected initial, pre-compression temperature.

29. A method according to claim 26 wherein the second piston presents a third piston face defining a control chamber in cooperation with a cylindrical recess in the head and wherein the engine further includes a low pressure line connecting the control chamber to a low pressure fluid reservoir and an on/off valve located in the low pressure line, said method further comprising:

opening the on/off valve before the first piston reaches bottom dead center and before the engine exhaust valve is opened at the conclusion of a power stroke of the first piston, thereby discharging fluid from the control chamber to the low pressure reservoir and returning the second piston to its retracted position by the force of the expanding combustion gases.

30. A method according to claim 29 further comprising:

sensing power demanded of the engine; and controlling the timing of closing the on/off valve to in turn control the extended position of the second piston and the maximum compression ratio in accordance with the sensed power demand.

* * * * *